United States Patent [19]
Gude et al.

[11] 4,250,291
[45] Feb. 10, 1981

[54] MELT ADHESIVE BASED ON POLYAMIDE FROM BRANCHED CHAIN DIAMINE

[75] Inventors: Fritz Gude; Siegfried Brandt, both of Wanne-Eickel, Fed. Rep. of Germany

[73] Assignee: Veba Chemie Aktiengesellschaft, Gelsenkirchen-Buer, Fed. Rep. of Germany

[21] Appl. No.: 913,994

[22] Filed: Jun. 9, 1978

Related U.S. Application Data

[63] Continuation of Ser. No. 655,044, Feb. 4, 1976, which is a continuation of Ser. No. 503,538, Sep. 5, 1974, abandoned.

[30] Foreign Application Priority Data

Sep. 4, 1973 [DE] Fed. Rep. of Germany ....... 2344420

[51] Int. Cl.³ ............................................. C08G 69/26
[52] U.S. Cl. .................................... 528/338; 528/324; 528/340; 528/346; 528/349
[58] Field of Search ............... 528/349, 340, 324, 346, 528/338

[56] References Cited

U.S. PATENT DOCUMENTS

| | | | |
|---|---|---|---|
| 2,864,807 | 12/1958 | Nobis et al. | 528/340 |
| 3,139,417 | 6/1964 | Duxbury | 528/343 |
| 3,352,835 | 11/1967 | Schmitt et al. | 528/340 |
| 3,449,273 | 6/1969 | Kettenring et al. | 260/18 N |
| 3,553,289 | 1/1971 | Duxbury et al. | 528/340 |
| 3,703,595 | 11/1972 | Falkenstein et al. | 528/349 |
| 3,839,121 | 10/1974 | Schmitt et al. | 156/331 |
| 3,850,887 | 11/1974 | Halas et al. | 528/340 |
| 3,940,373 | 2/1976 | Muraki et al. | 528/340 |
| 3,989,678 | 11/1976 | Furukawa et al. | 528/324 |

OTHER PUBLICATIONS

U.S.P. 3306875, cols. 1-2, 35-36.

*Primary Examiner*—Harold D. Anderson

[57] ABSTRACT

A polyamide copolymer, useful as a melt adhesive especially for textiles, produced from the following monomers 1. An unbranched aliphatic dicarboxylic acid with 6-20 C-atoms;
2. A diamine mixture consisting of
   (a) 20-80 mol percent, unbranched aliphatic diamines with 6-20 C-atoms; and
   (b) 80-20 mol percent branched aliphatic and/or cycloaliphatic diamines;

said copolymer having a molecular weight of 2000-40000.

5 Claims, No Drawings

MELT ADHESIVE BASED ON POLYAMIDE FROM BRANCHED CHAIN DIAMINE

This is a continuation, application Ser. No. 655,044, pending filed Feb. 4, 1976, which is a continuation of application Ser. No. 503,538, filed Sept. 5, 1974, now abandoned.

BACKGROUND

This invention relates to certain polyamide copolymers prepared from unbranched aliphatic dicarboxylic acids and a diamine mixture. More particularly, this invention relates to such polyamide copolymers which are useful as melt adhesives, especially for textiles.

It is known that certain polyamides can be applied as melt adhesives for textiles. The use of a polyamide for this purpose requires a good washing resistance to warm washing suds and a special melting characteristic that allows for processing in a technical important temperature range of about 120°-160° C.

It is also known that the melting behavior of a polyamide can be adjusted by copolymerization.

A further demand for textile melt adhesives is a high water absorption so that the vapor diffusion is not affected in the glued materials.

Up to the present, all polyamides, which have been used as textile melt adhesives, have shown, when in powder form, a tendency to bake or fuse together, especially when they contain aminocarboxylic acids. Therefore, additives are regularly mixed to these powders in order to improve the trickling ability. If the aminocarboxylic acids are omitted at mean average molecular weight (Mn), the fusion is decreased, but the range of melting temperatures is so small, that the polyamide cannot be processed in the common machines.

There is a need to transfer the good effect realized by use of branched diamines to compounds free of amino acid.

SUMMARY

The present invention provides polyamides of certain composition and a special range of molecular weight which polyamides in powder form do not fuse together, but show all advantages of the suitable polyamides known as melt adhesives.

The present invention thus relates to a polyamide copolymer of unbranched, aliphatic dicarboxylic acids with 6 to 20 C-atoms and a diamine mixture consisting of (a) 20–80 mol percent, preferably 20–70 mol percent unbranched aliphatic diamines with 6–20, preferably 6–12 C-atoms and (b) 80–20 mol percent, preferably 80–30 mol percent, branched, aliphatic and/or cycloaliphatic diamines with a molecular weight of 2000–40000, preferably 6000–25000, as melt adhesive, especially for textile materials.

DESCRIPTION

Smaller quantities of aminocarbonic acids and their lactames can also be used, in this case, however, the molar ratio of dicarboxylic acid: aminocarboxylic acid may not fall below > 9:1.

For preparing copolyamides unbranched aliphatic dicarboxylic acids with 6–20 C-atoms, as adipic-, pimelic-, suberic-, azelaic- and sebacic acid as well as undecane-, dodecane-, octadecanedicarbonic acid and others are suitable.

If desired, it is also possible to use smaller quantities of others than unbranched dicarbonic acids in order to control the melting viscosity.

As suitable unbranched aliphatic diamines with 6-20, preferably 6-12 C-atoms, hexamethylene-, heptamethylene-, octamethylene-, nonamethylene-, decamethylene-, undecamethylene-, dodecamethylene diamine and others can be mentioned for example.

As branched aliphatic and cycloaliphatic diamines the following compounds with 3-15 C-atoms can be mentioned especially for example: 1,2-propylene diamine, 2-and 3-methylhexamethylene diamines, 3-isopropyl-hexamethylene diamine, 2-tert, butyl-hexamethylene diamine, 2,3-, 2,4-, 2,5-, 3,3- and 3,4-dimethylhexamethylene diamine, 3-isooctyl-hexamethylene diamine, 3-iso-dodecylhexamethylene diamine, 2-methyl-4-ethylhexylmethyl diamine, 2,2,4- and 2,4,4-trimethylhexamethylene diamine, 2,2,5,5-tetramethylhexamethylene diamine, 2,4-diethyl-octamethylene diamine and others as well as the cycloaliphatic diamines, like 3,6-diamino-2-methylcyclohexane, 3-aminomethyl-3,5,5-trimethylcyclohexylamine, 4,4'-bis-aminomethyl-2,2'-dimethyl-dicyclohexylmethane and the like. Thereby especially those diamines which have 3 alkyl radicals, are preferred as the 1:1 mixture of 2,2,4- and 2,4,4-trimethylhexylene diamine and the 3-aminomethyl-3,5,5-trimethylcyclohexylamine. Naturally, also mixtures of these compounds can be applied. Advantageously are those which contain as well aliphatic as cycloaliphatic diamines.

As suitable aminocarboxylic acids and their lactams especially those with 4-12 C-atoms are to mention, as the ε-aminobutane-, ε-aminocaproic-, ε-aminododecane acid (ε-aminolaurine acid) and others.

It is preferred to manufacture the copolyamides by prior art methods, whereby the starting materials are heated from 150°-250° C. until the desired molecular weight is reached. This takes in general 2-5 hours, whereby the reaction time depends on the magnitude of the condensation. In known manner the molecular weights can be adjusted by using a slight excess of diamine- or dicarboxylic acid or by adding monofunctional amines or car acids.

The advantages of the copolyamides with respect to their use as melt adhesives, especially for textiles, is shown by the examples.

The use of mono- and dibranched diamines of the invention results in a decrease of the baking.

The subject of the present invention is illustrated by the following examples. In order to show the applicability of the manufactured copolyamides, a so-called baking-test is performed, which test is described follows.

Baking test

In a cylindrical form of 5 cm interior diameter a tablet of the testing material is pressed at a pressure of 0.12 kg/cm². The form is divided in the plain into two parts, which forms with the axis of the cylinder an angle of 90°. Both parts of the form are pulled apart in a testing machine in radial direction. The necessary power is related to the cross-section of the tablet and serves for the estimation of the baking of the material.

EXAMPLE 1

A polyamide of 1.0 mol adipic acid, 0.4 mol hexamethylene diamine, 0.3 mol 3-aminomethyl-3,5,5-trimethylcyclohexylamine (IPD), 0.3 mol of a 1:1 mixture of 2,4,4- and 2,2,4-trimethylhexamethylene diamine (TMD) and 0.03 mol caprolactam is produced by melt condensation according to known methods (5 hours at from 150° to 250° C. increasing temperature). The molecular weight was approximately 8000. The melt flow index had a value of approximately 12 at 160° C. and under a load of 2.16 kg. The product was reduced to a granular size of 80-200 $\mu$ and was subjected to a baking test. Thereby a value of 44 g/cm$^2$ was measured.

If the caprolactam part in the above mentioned composition is increased to 0.2 mol, the value of the baking goes up to 90 g/cm$^2$.

EXAMPLE 2

A polyamide of 1.0 mol adipic acid, 0.2 mol dodecamethylene diamine and 0.8 mol TMD was produced by melting condensation according to example 1. The molecular weight was approximately 10000. The melting index at 160° C. and a load of 2.16 kg was 7. Reduced to a granular size of 80-200 $\mu$ the product showed at the baking test a value of 38 g/cm$^2$.

EXAMPLE 3

A polyamide of 1.0 mol adipic acid, 0.2 mol dodecamethylene diamine and 0.8 mol 3-methylhexamethylene diamine was produced by melt condensation according to example 1. The molecular weight was approximately 10000. The melt flow index at 160° C. and under a load of 2.16 kg was 10.

Reduced to a granular size of 8-200 $\mu$, the product showed at the baking test a value of 60 g/cm$^2$.

EXAMPLE 4

A copolyamide of 1.0 mol azelaic acid, 0.6 mol hexamethylene diamine, 0.2 mol IPD and 0.2 mol TMD was produced according to example 1. The molecular weight was approximately 12000. At 160° C. and a load of 2.15 kg the melt flow index was 8. The value of the baking test measured at a powder of the granular size of 80-200 $\mu$, was 30 g/cm$^2$.

EXAMPLE 5

A copolyamide of 0.8 mol dodecane dicarbonic acid (1,12), 0.2 mol azelaic acid, 0.7 mol hexamethylene diamine, 0.15 mol IPD and 0.15 mol TMD was produced according to example 1 and mixed with 10 weight percent N-methylbenzene sulfonamide. The molecular weight was approximately 18000. At the pulverized material the following values were measured:

| | |
|---|---|
| granular size | 80-200 $\mu$ |
| melt flow index at 160° C. and a load of 2.16 kg | 13 |
| baking test | 42 g/cm$^2$ |

EXAMPLE 6

A copolyamide of 0.8 mol octadecanediacid-(1.18), 0.2 mol adipic acid, 0.7 mol 1.18-diaminooctadecane, 0.15 mol 3.3-dimethylpentane diamine-(1.5) and 0.15 mol 1-methyl-3,6-diaminocyclohexane was produced according to example 1. The molecular weight was approximately 12000. It had a melting index of 11 at 160° C. and a load of 2.16 kg. The value of the baking test, measured at a powder of the granular size of 80-200 $\mu$, was 64 g/cm$^2$.

The datas mentioned in the foregoing examples can be conformed by small modifications of the composition also to other demands. Therefore they do not mean a limitation. The molecular weights were stabilied in common manner.

What is claimed is:

1. A hot melt adhesive polyamide copolymer consisting essentially of the polymeric condensation product of adipic acid and a diamine mixture consisting of 20-80 mol percent of dodecamethylene diamine and 80-20 mol percent of a mixture of 2,2,4-trimethylhexamethylene diamine and 2,4,4-trimethylhexamethylene diamine.

2. A hot melt adhesive polyamide copolymer consisting essentially of the polymeric condensation product of adipic acid and a diamine mixture consisting of 20-80 mol percent dodecamethylenediamine and 80-20 mol percent 3-methylhexamethylene diamine.

3. A hot melt adhesive polyamide copolymer consisting essentially of the polymeric condensation product of azelaic acid and a diamine mixture consisting of 20-80 mol percent hexamethylene diamine and 80-20 mol percent of a mixture of 2,4,4-trimethylhexamethylene diamine, 2,2,4-trimethylhexamethylene diamine and 3-aminomethyl-3,5,5-trimethylcyclohexylamine.

4. A hot melt adhesive polyamide copolymer consisting essentially of the polymeric condensation product of dodecane dicarboxylic acid and azelaic acid and a diamine mixture consisting of 20-80 mol percent of hexamethylene diamine and 80-20 mol percent of a mixture of 3-aminomethyl-3,5,5-trimethylcyclohexylamine, 2,4,4-trimethylhexamethylene diamine and 2,2,4-trimethylhexamethylene diamine.

5. A hot melt adhesive polyamide copolymer consisting essentially of the polymeric condensation product of octadecanediacid and adipic acid and a diamine mixture consisting of 20-80 mol percent diaminooctadecane and 80-20 mol percent of a mixture of 3,3-dimethylpentane diamine and 1-methyl-3,6-diaminocyclohexane.

* * * * *